3,051,691
CATIONIC, NITROGENATED, HYDROPHILIC
COLLOIDS
Lee H. Elizer, Glen C. Glasscock, and John M. Seitz, Keokuk, Iowa, assignors to The Hubinger Company, Keokuk, Iowa, a corporation of Iowa
No Drawing. Filed Jan. 15, 1959, Ser. No. 786,926
12 Claims. (Cl. 260—91.3)

This invention relates to new nitrogenated polymeric hydrophilic colloids in aqueous colloidal dispersion and to processes for making them.

The object of this invention is the preparation of aqueous colloidal dispersions of nitrogenated polymeric hydrophilic colloids, which are cationic and, therefore, particularly advantageous for many uses, as, for example, because of their improved affinity for negatively charged materials, such as cellulose.

Other objects and advantages will become obvious from the following description.

We have discovered that when an aqueous colloidal dispersion or solution of a non-cationic, polymeric polyol hydrophilic colloid is treated with cyanamide in aqueous solution, the dispersed colloid reacts to form nitrogenated, cationic, colloidal products.

Substantially any non-cationic polymeric polyol, which possesses the properties of a hydrophilic colloid, namely, which dissolves or disperses in water, either at ordinary temperature or with the aid of heat, to form gels or viscous colloidal solutions or dispersions, can be employed for our purpose. Suitable polymeric polyol hydrophilic colloids include, for example, gelatinized starches and starch derivatives, such as hydroxymethyl and hydroxyethyl starch, dextrins, pectins, the polysaccharide gums, which, as used here includes the mucilages, such as locust bean, guar, karaya, agar, carageenin, arabic, tragacanth, algin, angico, mesquite, cedar, Indian, sterculia, satinwood, cherry, sassa and the like; solubilized cellulose derivatives, such as methyl cellulose and sodium carboxymethyl cellulose; hemicelluloses, such as xylan, araban, mannan, and galactan; polyvinyl alcohol; and the like. In some cases, e.g. hemicelluloses, aqueous colloidal dispersion requires the presence of an alkali such as sodium hydroxide or sodium carbonate.

The aqueously dispersed polymeric polyol colloid, reacts with cyanamide in aqueous solution to form a nitrogenated, cationic product at substantially any pH, ranging from a pH as low as 1.0 to a pH as high as 12 or more. The degree of nitrogenation varies to some extent with the particular pH and the particular polymeric polyol.

Reaction occurs at any temperature ranging from the freezing temperature of the mixture to temperatures as high as 200° F. or higher. Optimum maximum temperatures are generally in the range of about 80° F. to 120° F., depending upon the particular polymer.

The nitrogenated, cationic reaction product tends to revert to a non-cationic state after a period of time, which varies approximately inversely with temperature, the higher the temperature, the shorter being the cationic life. At ordinary temperatures, shelf life is generally about 24 hours or more. At temperatures close to freezing, shelf life is as long as two or more days. Thus the cationized, aqueous colloidal dispersions should, in general, not be prepared more than a day or so before use, and, preferably, not more than a few hours, for maximum efficiency.

The reason for the reversion is not clearly understood but may be due to the fact that the reaction by-products are not removed from the aqueous colloidal dispersion. The nitrogenated polyol reaction product may revert to its original form, degrade or react further with by-products to form a non-cationic derivative. Experimental evidence shows a loss of nitrogen, which indicates the probability of decomposition.

Other conditions such as the ratio of cyanamide to the polymeric polyol, the concentration of the cyanamide dissolved in the aqueous reaction mixture, or the time of reaction, are not critical, although they do influence the extent of nitrogen substitution. For example, higher ratios of total cyanamide tend to increase the degree of substitution.

The cyanamide can be introduced as such or in the form of its alkali metal or alkaline earth metal salts, such as the sodium, potassium or calcium salts. These derivatives can be completely metalated, such as CaNCN or $Na_2NCN$, or partially metalated, such as $Ca(HNCN)_2$ or NaHNCN.

Where cyanamide, $H_2NCN$, is employed, a desired alkalinity of the reaction mixtures can be obtained by addition of an alkali metal or alkaline earth metal base, such as sodium, potassium, lithium, calcium, barium or strontium hydroxide, or a desired acidity by addition of any suitable acid, such as hydrochloric acid, sulfuric acid, nitric acid, acetic acid and the like. A solution of the desired alkalinity can, in many cases, be made simply by using an alkali metal or alkaline earth metal cyanamide. An aqueous solution of calcium cyanamide, for example, generally has a pH in the range of about 10.5 to 11.9. An alkali metal or alkaline earth metal cyanamide hydrolyzes in water to form a solution which is substantially similar to an aqueous solution of cyanamide containing an alkali metal or alkaline earth metal base. The pH of a solution made by dissolving an alkali metal or alkaline earth metal cyanamide in water can, of course, be adjusted to any desired degree of alkalinity or acidity by addition of a base or an acid in suitable amount. In general we prefer to employ calcium cyanamide because of its low cost, availability and high efficiency.

The precise nature of the reaction mechanism or of the substituent nitrogen-containing radicals is not yet completely understood, although there seems little doubt that the reactive hydroxyl groups of the polymeric polyol participate in the reaction.

As aforementioned, the cyanamide reaction takes place with the polymeric polyol hydrophilic colloid colloidally dispersed in water in the form of a viscous colloidal solution, dispersion, paste or gel. Colloid dispersion can be accomplished in any conventional manner by mixing the polymer with water and heating if necessary. In some instances, as in the case of many of the hemicelluloses, solution is aided by addition of a base.

Starches must be gelatinized, namely cooked in aqueous suspension to the point where swelling of the granules takes place to form a viscous solution or paste. The starch can be from any source, such as corn starch, wheat starch, potato starch, tapioca and the like.

The polymeric polyol-cyanamide reaction mixture can be prepared in various ways. The cyanamide can be separately dissolved in water and then mixed with the aqueous colloidal dispersion of the polyol, with adjustment to a desired reaction pH being made prior to or after admixture. The cyanamide can be dissolved directly in the aqueous colloidal polyol dispersion. The polymeric polymer and the cyanamide compound can also be pre-mixed in the dry state and then reacted at the time of use by the addition of water to disperse the colloid and to dissolve the cyanamide compound.

The reaction mixture is maintained at the desired temperature, e.g. up to 200° F. and preferably at a maximum of about 80° to 120° F., for a period of time determined by such factors as the degree of nitrogenation desired, the particular polyol, the cyanamide concentration, and the like. Although nitrogenation takes place rapidly at elevated temperatures, reversion to a non-cationic state is also rapid, so that the reaction mixture ordinarily should be maintained at such elevated temperatures for periods not much longer than a few minutes to an hour or so and then cooled to ordinary or reduced temperatures. In general, excellent nitrogenation and cationization is obtained by reaction at ordinary temperatures, with adequate shelf life for most purposes. Somewhat better results in terms of degree of substitution and shelf life can be achieved at reduced temperatures.

We have also found that, in cases where the polyol-cyanamide reaction has been carried out at higher pH, the degree of nitrogen substitution can frequently be increased by acidifying the mixture, after reaction for the desired period of time, to a pH below 4 and as low as 2 or less. This is not essential, however, since substantial nitrogenation and cationization takes place without this expedient. Substantially any acid can be used, including inorganic and organic acids, such as hydrochloric, nitric, sulfuric, sulfurous, phosphoric, acetic, propionic acids and the like. In general, we prefer to employ hydrochloric, nitric or sulfuric acid.

The physical properties of the aqueous colloidal polyol dispersions are not appreciably altered or adversely affected by the cyanamide treatment. The colloids do, however, possess the important property of being cationic so that they have a strong affinity for negatively charged materials, such as cellulose. They are, therefore, especially advantageous for use in textile finishing and sizing, as a beater additive and in coatings in paper making, in adhesives, for the bonding of negatively charged pigments, in ore beneficiation, in water purification and the like.

The simplicity of the treatment makes it possible for the ultimate user of the aqueous colloidal polyol dispersions to apply it just prior to use merely by colloidally dispersing a dry polyol-cyanamide mix in water or by admixing an aqueous colloidal polyol dispersion with the cyanamide, permitting reaction for an adequate length of time, and then employing the colloidal dispersion, with or without acidification, in conventional manner, as, for example, as a paper beater additive, or the like.

*Example 1*

A. 36 grams of 90 alkaline fluidity granular corn starch, having a nitrogen content of 0.006% by weight, were slurried in 784 mls. water, and gelatinized by heating to 200° F. for 5 minutes. The resulting starch paste was cooled to 78° F. It had a pH of 7.0 and 0 charge as determined by electrolysis.

11 grams hydrated grade CaNCN were slurried in 200 mls. water at 78° F. for 15 minutes and filtered. The filter cake was washed with 50 mls. water and the washings added to the filtrate. The cyanamide filtrate was then added to the starch paste. After 4 hours at 78° F. pH of the reaction mixture was 11.2, and sign of charge +.

The polymer was precipitated from colloidal dispersion with 3 volumes of glacial acetic acid, washed free of by-products with 75% acetic acid, and subjected to Kjeldahl analysis. Nitrogen percent dry basis was 0.73% or 4.4 moles $N_2$/100 AGU.

B. Reaction mixtures prepared as described above were held at the temperatures shown below and the sign of charge determined at the time intervals indicated:

| Time | 200° F. | | 78° F. | | 32.5° F. | |
|---|---|---|---|---|---|---|
| | pH | Sign | pH | Sign | pH | Sign |
| 5 minutes | 11.2 | + | 11.2 | + | 11.2 | + |
| 4 hours | 10.1 | 0 | 11.2 | + | 11.3 | + |
| 24 hours | | | 11.4 | + | 11.3 | + |
| 48 hours | | | 11.4 | + | 11.3 | + |
| 72 hours | | | 11.3 | 0 | 11.3 | + |
| 96 hours | | | | | 11.3 | 0 |

C. Reaction mixtures were prepared as described above except that the pH of the polymer and cyanamide solutions was adjusted to the values shown in the table before mixing. After 4 hours at 78° F. the sign of the charge was determined, and the polymer was precipitated from solution with 3 volumes glacial acetic acid, washed free of by-products with 75% acetic acid, and analyzed for nitrogen content.

| pH | 11.0 | 9.6 | 7.1 | 5.0 | 3.6 | 1.9 |
|---|---|---|---|---|---|---|
| Sign of charge | + | + | + | + | + | + |
| Nitrogen percent dry basis | 0.725 | 1.020 | 1.185 | 0.683 | 0.630 | 0.498 |
| Moles $N_2$/100 AGU | 4.4 | 6.1 | 7.2 | 4.0 | 3.7 | 2.9 |

This example demonstrates the reduced reversion rate to non-cationicity at normal to reduced temperatures and the substantial nitrogen substitution of reaction mixtures varying from highly acidic to highly alkaline.

*Example 2*

180 grams of 90 alkaline fluidity, granular corn starch nitrogen content 0.006%, were suspended in 820 ml. water, heated to 200° F. for 5 minutes to form a starch paste, and then cooled to 78° F. Volume was adjusted with water to 5 equal 200 ml. portions.

A. 72 grams hydrated grade CaNCN were slurried in 200 mls. water for 15 minutes at 78° F. and filtered. The filter cake was washed with 200 mls. water, and the washings combined with the filtrate. The pH was adjusted to 7.0 with HCl. The cyanamide solution was added to one of the 200 ml. starch paste portions, and the mixture stirred at 78° F. for 4 hours. The pH of the reaction mixture was 7.1, sign of charge +. A portion was precipitated with 3 volumes glacial acetic acid and washed free of by-products with 75% acetic acid.

B. Same as A except use only 48 grams CaNCN.
C. Same as A except use only 24 grams CaNCN.
D. Same as A except use only 12 grams CaNCN.
E. Same as A except use only 6 grams CaNCN.
Product analysis:

| | A | B | C | D | E |
|---|---|---|---|---|---|
| Nitrogen percent dry basis | 1.961 | 1.228 | 0.667 | 0.520 | 0.385 |
| Moles $N_2$/100 AGU | 12.2 | 7.5 | 3.9 | 3.1 | 2.3 |

This demonstrates the increased degree nitrogenation with higher cyanamide concentrations.

*Example 3*

A. A paste was prepared by slurrying 36 grams of unmodified, granular corn starch, nitrogen content 0.017%, in 784 mls. water, heating to 200° F. for 5 minutes, and then cooling to 78° F. pH of paste was 5.2, sign of charge 0.

11 grams hydrated grade CaNCN were slurried in 200 mls. water at 78° F. for 15 minutes and filtered. The filter cake was washed with 50 mls. water and the washings added to the filtrate. The cyanamide solution was added to the starch paste. After 4 hours at 78° F., pH of the reaction mixture was 11.1, and sign of charge +. The polymer was precipitated with 3 volumes glacial acetic acid, washed free of by-products with 75% acetic acid and analyzed for nitrogen. Nitrogen percent dry basis was 0.689 or 4.1 moles $N_2$/100 AGU.

B. Reaction mixtures prepared as described above were held at the temperatures shown and the sign of charge determined at the time intervals indicated:

| Time | 78° F. | | 32.5° F. | |
|---|---|---|---|---|
| | pH | Sign | pH | Sign |
| 5 minutes | 11.2 | + | 11.0 | + |
| 4 hours | 11.2 | + | 11.2 | + |
| 24 hours | 11.1 | + | 11.1 | + |
| 48 hours | 11.1 | + | 11.1 | + |
| 72 hours | 11.1 | + | 11.1 | + |
| 96 hours | | | 11.1 | 0 |

C. Reaction mixtures were prepared as described above except that the pH of the polymer and cyanamide solutions was adjusted to the values shown in the table before mixing. After 4 hours at 78° F. the sign of the charge was determined, and the polymer was precipitated with 3 volumes glacial acetic acid, washed free of by-products with 75% acetic acid and analyzed.

| pH | 11.1 | 9.7 | 7.0 | 5.2 | 4.0 | 2.1 |
|---|---|---|---|---|---|---|
| Sign of charge | + | + | + | + | + | + |
| Nitrogen percent dry basis | 0.265 | 0.286 | 0.245 | 0.213 | 0.198 | 0.197 |
| Moles $N_2$/100 AGU | 1.5 | 1.7 | 1.4 | 1.2 | 1.1 | 1.1 |

*Example 4*

A. A paste was prepared by slurrying 36 grams of unmodified, granular waxy corn starch, nitrogen content 0.009%, in 784 mls. water, heating to 200° F. for 5 minutes, and then cooling to 78° F. pH of paste was 7.0, sign of charge 0.

11 grams hydrated grade CaNCN were slurried in 200 mls. water at 78° F. for 15 minutes and filtered. The filter cake was washed with 50 mls. water and the washings added to the filtrate. The cyanamide solution was added to the starch paste. After 4 hours at 78° F., pH of the reaction mixture was 11.1, and sign of charge +. The polymer was precipitated with 3 volumes glacial acetic acid and washed free of by-products with 75% acetic acid. Nitrogen percent dry basis was 0.201; moles $N_2$/100 AGU 1.2.

B. Reaction mixtures prepared as described above were held at the temperatures shown and sign of charge determined at time intervals indicated:

| Time | 78° F. | | 32.5° F. | |
|---|---|---|---|---|
| | pH | Sign | pH | Sign |
| 5 minutes | 11.2 | + | 11.2 | + |
| 4 hours | 11.4 | + | 11.2 | + |
| 24 hours | 11.2 | + | 11.2 | + |

C. Reaction mixtures were prepared as described above except that the pH of the polymer and cyanamide solutions was adjusted to values shown in table before mixing. After 4 hours at 78° F., the sign of the charge was determined, and the polymer was precipitated with 3 volumes of glacial acetic acid, washed free of by-products with 75% acetic acid and analyzed.

| pH | 11.0 | 9.5 | 7.1 | 4.9 | 3.6 | 2.0 |
|---|---|---|---|---|---|---|
| Sign of charge | + | + | + | + | + | + |
| Nitrogen percent dry basis | 0.289 | 0.311 | 0.229 | 0.211 | 0.236 | 0.224 |
| Moles $N_2$/100 AGU | 1.7 | 1.8 | 1.3 | 1.2 | 1.3 | 1.3 |

*Example 5*

6 grams of white corn dextrin, 90% cold water soluble, nitrogen content 0.055%, were dispersed into 200 ml. water. The pH of the colloidal dispersion was 3.8 and charge 0.

11 grams of CaNCN were slurried in 200 ml. of water for 15 minutes at 78° F. and filtered. The filter cake was washed with 50 ml. water and the washings added to the filtrate. The cyanamide solution was added to the dextrin solution. pH of the mixture was 10.8 and charge of the colloid was +. After 4 hours of reaction time at 78° F., pH was 10.5 and charge +. The polymer was precipitated with 3 volumes of glacial acetic acid, washed free of salts with 75% acetic acid and analyzed. Nitrogen content was 1.143; moles $N_2$/100 AGU 6.9.

*Example 6*

Hemicellulose was prepared according to the method of Wolf et al., Cereal Chemistry, vol. XXX, #6, page 451, November 1953. 100 grams "Red Dog" corn bran were slurried in 2 liters water, filtered and washed. The filter cake was slurried in 500 ml. 2% soda ash and held for 2 hours under a pressure of 15 lbs. p.s.i.g. After 1 liter of water was added, the mixture was boiled for 1 hour and filtered. The filtered hemicellulose solution had a pH of 8.8 and charge —. Nitrogen content of the hemicellulose was 0.560%.

11 grams CaNCN were slurried in 200 ml. water for 15 minutes at 78° F., filtered and washed with 50 ml. water. The combined filtrate and washings were added to an equal volume of the hemicellulose solution. pH of the resulting mixture was 11 and charge of the colloid was +. After 4 hours at 78° F., 3 volumes of glacial acetic acid were added to precipitate the polymer, which was then washed free of salts with 75% acetic acid. Nitrogen content of the polymer was 0.817.

*Example 7*

A. An aqueous colloidal dispersion of locust bean gum, a polysaccharide similar to guaran, nitrogen content 0.406%, was made by stirring 36 grams of the gum with 700 mls. of water. Charge of the gum was 0 and pH of the colloidal dispersion was 6.0.

11 grams hydrated grade CaNCN were slurried in 200 mls. water at 78° F. for 15 minutes and filtered. The filter cake was washed with 50 mls. water and the washings added to the filtrate. The cyanamide solution was added to the colloidal gum dispersion. After 4 hours at 78° F., pH was 11.6, sign of charge +. The polymer was precipitated with 3 volumes glacial acetic acid, washed free of by-products with 75% acetic acid. Nitrogen percent dry basis was 0.84.

B. Reaction mixtures prepared as described above were held at the temperatures shown and sign of charge determined at intervals of time indicated:

| Time | 78° F. | | 32.5° F. | |
|---|---|---|---|---|
| | pH | Sign | pH | Sign |
| 5 minutes | 11.5 | + | 11.6 | + |
| 4 hours | 11.6 | + | 11.5 | + |
| 24 hours | 11.6 | + | 11.6 | + |
| 48 hours | 11.6 | 0 | 11.5 | + |
| 72 hours | | | 11.5 | 0 |

C. Reaction mixtures were prepared as described above except that the pH of the polymer and cyanamide solutions was adjusted to the values shown in the table before mixing. After 4 hours at 78° F., the charge was determined:

| pH | 11.1 | 9.5 | 7.0 | 5.0 | 3.7 | 1.9 |
|---|---|---|---|---|---|---|
| Sign of charge | + | + | + | + | + | + |

*Example 8*

A. 36 grams of guaran, a neutral galactomannan polysaccharide from the seed of the plant family Leguminosae, nitrogen content 0.506%, were made into an aqueous colloidal dispersion by stirring with 700 mls. water, pH 6.7, sign of charge 0.

11 grams hydrated grade CaNCN were slurried in 200 mls. water at 78° F. for 15 minutes and filtered. The filter cake was washed with 50 mls. water and the washings added to the filtrate. The cyanamide solution was added to the colloidal gum dispersion. After 4 hours at 78° F., pH 11.4, sign of charge +. The polymer was precipitated with 3 volumes glacial acetic acid, and washed free of by-products with 75% acetic acid. Nitrogen percent dry basis 1.05.

B. Reaction mixtures prepared as described above were held at the following temperatures and the sign of the charge determined:

| Time | 200° F. | | 78° F. | | 32.5° F. | |
| --- | --- | --- | --- | --- | --- | --- |
| | pH | Sign | pH | Sign | pH | Sign |
| 5 minutes | 10.7 | + | 11.6 | + | 11.5 | + |
| 4 hours | 11.3 | + | 11.6 | + | 11.6 | + |
| 24 hours | 9.2 | 0 | 11.6 | + | 11.7 | + |
| 168 hours | | | 11.5 | 0 | 11.8 | 0 |

C. Reaction mixtures were prepared as described above except that the pH of the polymer and cyanamide solutions was adjusted to the values shown in the table before mixing. After 4 hours at 78° F. the sign of charge was determined:

| pH | 11.1 | 9.6 | 6.8 | 4.9 | 3.8 | 2.3 |
| --- | --- | --- | --- | --- | --- | --- |
| Sign of charge | + | + | + | + | + | + |

*Example 9*

A. A paste of gum tragacanth, the dried gummy exudation from Astragalus gummifer, nitrogen content 0.247%, was made by stirring 36 grams of the gum with 600 mls. water. pH 5.8, sign of charge 0.

11 grams hydrated grade CaNCN were slurried in 200 mls. water at 78° F. for 15 minutes and filtered. The filter cake was washed with 50 mls. water and the washings added to the filtrate. The cyanamide solution was added to the gum dispersion. After 4 hours at 78° F., pH was 11.3, and sign of charge +.

The polymer was precipitated with 3 volumes glacial acetic acid, and washed free of by-products with 75% acetic acid. Nitrogen percent dry basis 0.40.

B. Reaction mixtures, prepared as described above, were held at the various temperatures for the intervals of time shown in the table and the pH and the sign of charge determined.

| Time | 200° F. | | 78° F. | | 32.5° F. | |
| --- | --- | --- | --- | --- | --- | --- |
| | pH | Sign | pH | Sign | pH | Sign |
| 5 minutes | 10.9 | + | 10.9 | + | 10.9 | + |
| 4 hours | 9.5 | + | 10.5 | + | 10.9 | + |
| 24 hours | 8.3 | 0 | 10.5 | 0 | 10.7 | 0 |

C. Reaction mixtures were prepared as described above except that the pH of the polymer and cyanamide solutions was adjusted to the values shown in the table before mixing. After 4 hours at 78° F., the sign of the charge was determined.

| pH | 10.7 | 9.6 | 6.9 | 5.2 | 3.6 | 2.1 |
| --- | --- | --- | --- | --- | --- | --- |
| Sign of charge | + | + | + | + | + | + |

*Example 10*

A. A colloidal solution of gum arabic, nitrogen content 0.094%, was made by stirring 36 grams of the gum in 200 mls. of water at 78° F.

11 grams hydrated grade calcium cyanamide were slurried in 200 mls. water at 78° F. for 15 minutes and filtered. The filter cake was washed with 50 mls. water and the washings added to the filtrate. The cyanamide solution was added to the gum arabic solution. After 4 hours at 78° F., the sign of charge was positive; pH was 11.3. The polymer was precipitated by the addition of 3 volumes of glacial acetic acid. The precipitate was washed free of by-products with 75% acetic acid and the nitrogen content determined. Nitrogen percent dry basis was 0.65.

B. Reaction mixtures, prepared as described above, were held at the various temperatures for the intervals of time shown in the table and the pH and sign of charge determined:

| Time | 78° F. | | 32.5° F. | |
| --- | --- | --- | --- | --- |
| | pH | Sign | pH | Sign |
| 5 minutes | 11.7 | + | 11.6 | + |
| 4 hours | 11.7 | + | 11.6 | + |
| 168 hours | 11.9 | 0 | 11.5 | 0 |

C. Reaction mixtures were prepared as described above except that the pH of the polymer and cyanamide solution was adjusted to the values shown in the table before mixing. After 4 hours at 78° F., the sign of charge was determined, and at pH 7.1, the polymer was precipitated from solution with acetic acid, washed, and nitrogen determined.

| pH | 11.1 | 9.7 | 7.1 | 4.9 | 3.3 | 2.0 |
| --- | --- | --- | --- | --- | --- | --- |
| Sign of charge | + | + | + | + | + | + |
| Nitrogen percent dry basis | | | 2.82 | | | |

*Example 11*

A. A colloidal dispersion of karaya gum, the dried exudate of the tree, *Sterculia urens*, 0 nitrogen, was made by stirring 36 grams gum with 700 mls. water, pH 4.4, sign of charge 0.

11 grams hydrated grade CaNCN were slurried in 200 mls. water at 78° F. for 15 minutes and filtered. The filter cake was washed with 50 mls. water and the washings added to the filtrate. The cyanamide solution was added to the gum dispersion. After 4 hours at 78° F., pH was 11.3, sign of charge +.

The polymer was precipitated with 3 volumes glacial acetic acid, washed free of by-products with 75% acetic acid. Nitrogen percent dry basis, 0.51.

B. Reaction mixtures prepared as described above were held at the temperatures shown and sign of charge determined at time intervals indicated.

| Time | 78° F. | | 32.5° F. | |
| --- | --- | --- | --- | --- |
| | pH | Sign | pH | Sign |
| 5 minutes | 11.1 | + | 11.1 | + |
| 4 hours | 11.2 | + | 11.1 | + |
| 24 hours | 11.6 | + | 11.1 | + |
| 48 hours | 11.4 | 0 | 11.2 | + |
| 72 hours | | | 11.2 | 0 |

C. Reaction mixtures were prepared as described above except that the pH of the polymer and cyanamide solutions was adjusted to the values shown in the table before mixing. After 4 hours at 78° F., the sign of the charge was determined:

| pH | 11.1 | 9.6 | 7.1 | 5.2 | 3.5 | 1.9 |
| --- | --- | --- | --- | --- | --- | --- |
| Sign of charge | + | + | + | + | + | + |

*Example 12*

A. A paste of agar, the sulfuric acid ester of a linear galactan extracted from the red seaweed of the Gelidium family, nitrogen content 0.053%, was made by stirring 36 grams gum with 700 mls. water, pH 7.0, sign of charge 0.

11 grams hydrated grade CaNCN were slurried in 200 mls. water at 78° F. for 15 minutes and filtered. The filter cake was washed with 50 mls. water and the washings added to filtrate. The cyanamide solution was added to the agar dispersion. After 4 hours at 78° F., pH was 11.3, sign of charge +. The polymer was precipitated with 3 volumes of glacial acetic acid, washed free of by-products with 75% acetic acid and analyzed. Nitrogen percent dry basis, 0.325.

B. Reaction mixtures prepared as described above were held at the temperatures shown and sign of charge determined at time intervals indicated:

| Time | 78° F. | | 32.5° F. | |
|---|---|---|---|---|
| | pH | Sign | pH | Sign |
| 5 minutes | 11.4 | + | 11.3 | + |
| 4 hours | 11.3 | + | 11.3 | + |
| 24 hours | 11.3 | + | 11.3 | + |
| 48 hours | 11.3 | + | 11.4 | + |
| 72 hours | 11.6 | 0 | 11.4 | + |
| 96 hours | | | 11.4 | 0 |

C. Reaction mixtures were prepared as described above except that the pH of the polymer and cyanamide solutions was adjusted to the values shown in the table before mixing. After 4 hours at 78° F. the sign of the charge was determined:

| pH | 11.2 | 9.6 | 7.1 | 5.0 | 3.7 | 2.1 |
|---|---|---|---|---|---|---|
| Sign of charge | + | + | + | + | + | + |

*Example 13*

A. A colloidal citrus pectin solution, nitrogen content 0.038%, was made by stirring 36 grams of the pectin with 700 mls. water, pH 3.1, sign of charge 0.

11 grams hydrated grade CaNCN were slurried in 200 mls. water at 78° F. for 15 minutes and filtered. The filter cake was washed with 50 mls. water and the washings added to the filtrate. The cyanamide solution was added to the pectin solution. After 4 hours at 78° F., pH was 10.6, sign of charge +.

The polymer was precipitated with 3 volumes of glacial acetic acid and washed free of by-products with 75% acetic acid. Nitrogen percent dry basis 1.44.

B. Reaction mixtures prepared as described above were held at the temperatures shown and sign of charge determined at time intervals indicated:

| Time | 78° F. | | 32.5° F. | |
|---|---|---|---|---|
| | pH | Sign | pH | Sign |
| 5 minutes | 10.7 | + | 10.7 | + |
| 4 hours | 10.7 | + | 10.7 | + |
| 24 hours | 10.7 | + | 10.7 | + |
| 48 hours | 10.7 | − | 10.7 | + |
| 72 hours | | | 10.7 | − |

C. Reaction mixtures were prepared as described above except that the pH of the polymer and cyanamide solutions was adjusted to the values shown in the table before mixing. After 4 hours at 78° F., the sign of the charge was determined:

| pH | 11.1 | 9.4 | 7.2 | 5.1 | 3.8 | 2.2 |
|---|---|---|---|---|---|---|
| Sign of charge | + | + | + | + | + | + |

*Example 14*

A. A clear smooth paste of sodium carboxymethyl cellulose, moles—$CH_2COONa$/100 monomers=75.0, nitrogen content 0, was made by stirring 36 grams in 600 mls. water, 78° F., pH 6.7, sign of charge —.

11 grams hydrated grade calcium cyanamide were slurried in 200 mls. water at 78° F. for 15 minutes and filtered. The filter cake was washed with 50 mls. water and the washings added to the filtrate. The cyanamide solution was added to the CMC paste. After 4 hours at 78° F., the sign of the charge was positive, and the pH was 11.9.

The polymer was precipitated by addition of 3 volumes of glacial acetic acid. The precipitate was washed free of by-products with 75% acetic, and the nitrogen content determined. Nitrogen percent dry basis was 2.1. Moles $N_2$/100 AGU=16.7.

B. Reaction mixtures prepared as described above were held at the various temperatures for the intervals of time shown in the table and the pH and sign of charge determined.

| Time | 200° F. | | 78° F. | | 32.5° F. | |
|---|---|---|---|---|---|---|
| | pH | Sign | pH | Sign | pH | Sign |
| 5 minutes | 10.9 | + | 11.8 | + | 11.9 | + |
| 4 hours | 10.9 | + | 11.8 | + | 11.9 | + |
| 24 hours | 11.0 | 0 | 11.5 | + | 11.5 | + |
| 168 hours | | | 11.5 | 0 | 11.5 | − |

C. Reaction mixtures were prepared as described above except that the pH of the polymer and the cyanamide solution were adjusted to the values shown in the table before mixing. After 4 hours at 78° F., the sign of charge was determined and in two instances, the polymer was precipitated with acetic acid, washed and its nitrogen content determined.

| pH | 11.3 | 9.8 | 5.9 | 2.9 | 2.1 | 1.4 |
|---|---|---|---|---|---|---|
| Sign of charge | + | + | + | + | + | + |
| Nitrogen percent dry basis | | | | 0.31 | | 0.60 |

*Example 15*

A. A methyl cellulose dispersion, nitrogen content 0, was prepared by stirring 36 grams in 700 mls. water, pH 7.1, sign of charge 0.

11 grams hydrated grade CaNCN were slurried in 200 mls. water at 78° F. for 15 minutes and filtered. The filter cake was washed with 50 mls. water and the washings added to the filtrate. After 1 hour at 78° F., pH was 11.5, sign of charge +. The polymer was precipitated with hot water. Nitrogen percent dry basis 1.28.

B. Reaction mixtures prepared as described above were held at the temperatures shown and the sign of charge determined at time intervals indicated:

| Time | 78° F. | | 32.5° F. | |
|---|---|---|---|---|
| | pH | Sign | pH | Sign |
| 5 minutes | 11.4 | + | 11.6 | + |
| 1 hour | 11.5 | + | 11.5 | + |
| 2 hours | 11.5 | + | 11.6 | + |
| 3 hours | 11.5 | 0 | 11.5 | 0 |

C. Reaction mixtures were prepared as described above except that the pH of the polymer and cyanamide solutions was adjusted to the values shown in the table before mixing. After one hour at 78° F., the sign of charge was determined.

| pH | 11.1 | 9.6 | 7.0 | 4.9 | 3.7 | 2.1 |
|---|---|---|---|---|---|---|
| Sign of charge | + | + | + | + | + | + |

*Example 16*

A. 36 grams polyvinyl alcohol, nitrogen content 0, were stirred into 300 mls. water, heated to 200° F. for 5 minutes and cooled to 78° F., pH 8.3, sign of charge 0. 11 grams hydrated grade CaNCN were slurried in 200 mls. water 15 minutes, 78° F., and filtered. The filter cake was washed with 50 mls. water and the washings added to the filtrate, which was then stirred into the polyvinyl alcohol paste. After 1 hour at 78° F., pH was 11.4, sign of charge +. A portion was precipitated with 3 volumes glacial acetic acid, and the precipitate was washed free of by-products with 75% acetic acid. Nitrogen percent dry basis was 0.823.

B. Reaction mixtures were prepared as described above and heated at the temperatures shown in the table for the time intervals indicated:

| Time | 200° F. | | 78° F. | | 32.5° F. | |
|---|---|---|---|---|---|---|
|  | pH | Sign | pH | Sign | pH | Sign |
| 5 minutes | 11.7 | + | 11.4 | + | 11.5 | + |
| 1 hour | 11.4 | + | 11.4 | + | 11.6 | + |
| 4 hours | 11.7 | 0 | 11.4 | 0 | 11.6 | 0 |

C. Reaction mixtures were prepared as described above except that the pH of polymer and cyanamide solutions was adjusted to values shown in table before mixing. After 5 minutes at 78° F., the sign of charge was determined:

| pH | 11.0 | 9.6 | 7.1 | 5.0 | 3.8 | 1.9 |
|---|---|---|---|---|---|---|
| Sign of charge | + | + | + | + | + | + |

*Example 17*

36 grams #90 fluidity granular corn starch, nitrogen content 0.006%, were slurried in 200 mls. water, heated at 200° F. for 5 minutes and cooled to 78° F., pH 4.9, charge 0.

12 grams hydrated grade CaNCN were slurried in 200 mls. water for 15 minutes at 78° F. 10 grams sodium carbonate were added in 50 mls. water and the mixture stirred for 5 minutes and filtered. The filter cake was washed with 50 mls. water and the washings combined with the filtrate. The resulting solution of sodium cyanamide was added to the starch paste. After 4 hours at 78° F., pH was 11.7, charge +. A portion of the polymer was precipitated with glacial acetic acid, washed with 75% acetic acid and analyzed for nitrogen. Nitrogen content was 0.617%.

*Example 18*

A solution of $H_2NCN$ was prepared by slurrying 12 grams CaNCN in 200 mls. water for 15 minutes at 78° F. and then filtering. The filter cake was washed with 50 mls. water and the washings added to the filtrate, which was then adjusted to pH 5.0 with cool 20% $H_2SO_4$. The precipitated $CaSO_4$ was filtered off and washed with 50 mls. of water, which was combined with the filtrate. The resulting solution of $H_2NCN$ was added to a starch paste prepared as in Example 17. After 4 hours at 78° F., pH was 6.2 and charge +. The polymer, after precipitation with glacial acetic acid, analyzed 0.366% nitrogen.

*Example 19*

36 grams of sodium alginate, nitrogen content 0.017% were dispersed in 1700 mls. water at 78° F., pH 6.8, charge 0. A solution of $H_2NCN$, prepared as in Example 18, was added to the colloidal polymer dispersion. After 4 hours at 78° F., pH was 8.2, charge +. The polymer, precipitated with glacial acetic acid, analyzed 0.566% nitrogen.

*Example 20*

The following tests demonstrate the increased affinity or substantivity of starch pastes, treated according to our invention, for negatively charged material such as cellulose.

The tests for substantivity of the treated starch paste were carried out as follows:

Into each of five 200 ml. glass cylinders, was introduced 1 ml. of iodine solution made by dissolving 2 grams iodine and 3 grams KI in 1 liter of water. If the filtrate to be tested was alkaline, 1 ml. glacial acetic acid was added. A funnel whose stem was packed with 0.05 gram Solkafloc instead of filter paper, was placed in each cylinder. 95 mls. of a 1% Solkafloc dispersion, prepared by mixing 10 grams Solkafloc, high grade cellulose fibers, with water up to 1 liter, were placed in each of 5 beakers. Increments of treated starch paste were added to the Solkafloc in the beakers in increasing amounts and stirred gently for about 5 minutes. These mixtures were poured into the funnels. The substantivity is the number mls. 1% treated starch paste that can be added to 95 mls. Solkafloc with the filtrate retaining the brown color of the iodine. The substantivity is also equal to the number of grams of starch retained by 100 grams cellulose fiber.

A. 72 grams unmodified corn starch were slurried in 928 mls. water, boiled 5 minutes, and cooled to 78° F.

11 grams (15% by weight of the starch) crude calcium cyanamide were slurried in 928 mls. water for 30 minutes at 78° F. and the volume adjusted to exactly 2 liters. The pH was 10.8.

(a) At the time intervals indicated below, 27.8 mls. paste (1 gram dry substance starch), were removed, the pH adjusted to 3.7 with HCl, diluted to 100 mls., and the substantivity determined.

(b) Same as (a) except that the 27.8 mls. were diluted to 100 mls. without adjusting the pH and the substantivity determined.

| Time | Substantivity | |
|---|---|---|
|  | a | b |
| 5 minutes | 5.0 | 1.0 |
| 1 hour | 3.5 | 1.5 |
| 2 hours | 3.0 | 1.5 |
| 3 hours | 2.5 | 1.5 |
| 24 hours | 1.5 | 1.5 |

B. Same as A except that the crude calcium cyanamide was cut to 4 grams or 5.5% of the weight of the starch. pH of paste=11.2.

| Time | Substantivity | |
|---|---|---|
|  | a | b |
| 5 minutes | 2.0 | 0.25 |
| 1 hour | 1.5 | 0.25 |
| 2 hours | 1.5 | 0.25 |
| 3 hours | 1.5 | 0.25 |
| 24 hours | 1.5 | 0.25 |

C. Same as B except that the calcium cyanamide slurry was used instead of the filtrate. pH of paste=11.6.

| Time | Substantivity | |
|---|---|---|
|  | a | b |
| 5 minutes | 1.5 | 0.25 |
| 1 hour | 1.5 | 0.25 |
| 3 hours | 1.5 | 0.25 |

D. Same as A except that the pH of the reaction was adjusted to 9.6 with HCl before adjusting to exactly 2 liters.

| Time | Substantivity | |
|---|---|---|
| | a | b |
| 5 minutes | 3.0 | 1.5 |
| 1 hour | 2.5 | 1.0 |
| 2 hours | 2.5 | 1.0 |
| 24 hours | 1.5 | 3.5 |
| 26 hours | 1.0 | 4.0 |
| 48 hours | 1.0 | 4.0 |

E. Same as A except that the reaction temperature was 110° F.

| Time | Substantivity | |
|---|---|---|
| | a | b |
| 5 minutes | 2.5 | 0.25 |
| 1 hour | 1.5 | 0.25 |
| 2 hours | 2.0 | 0.50 |
| 10 hours | 1.5 | 0.50 |
| 24 hours | 1.0 | 1.0 |

F. Same as A except that 22 grams crude calcium cyanamide (30% of the weight of the starch) were used.

| Time | Substantivity | |
|---|---|---|
| | a | b |
| 5 minutes | 0.5 | 0.5 |
| 4 hours | 1.5 | 1.0 |
| 24 hours | 1.5 | 1.0 |

G. Same as F except that the reaction temperature was 40° F.

| Time | Substantivity | |
|---|---|---|
| | a | b |
| 5 minutes | 3.5 | 0.5 |
| 4 hours | 6.0 | 3.0 |
| 24 hours | 11.0 | 8.0 |

H. Same as A except that the pH of the filtrate from the $CaCN_2$ slurry was adjusted to pH 8.0 with HCl before adding to starch paste.

| Time | Substantivity | |
|---|---|---|
| | a | b |
| 5 minutes | 2.0 | 0.5 |
| 4 hours | 2.5 | 1.0 |
| 24 hours | 4.0 | 2.5 |

I. Same as A except that the pH of the filtrate from the $CaCN_2$ slurry was adjusted to pH 5.0 with HCl before adding to starch paste.

| Time | Substantivity | |
|---|---|---|
| | a | b |
| 5 minutes | 1.0 | 0.5 |
| 4 hours | 2.0 | 0.5 |
| 24 hours | 2.0 | 0.5 |

J. Same as I except that sulfuric acid was used to reduce pH and the $CaSO_4$ precipitate was filtrated off.

| Time | Substantivity | |
|---|---|---|
| | a | b |
| 5 minutes | 0.5 | 0.5 |
| 4 hours | 2.0 | 0.5 |
| 24 hours | 2.0 | 0.5 |

Example 21

72 grams #90 fluidity granular corn starch, nitrogen content 0.006%, were slurried in 400 ml. water and heated at 200° F. for 5 minutes.

22 grams CaNCN were slurried in 400 ml. water at 78° F. for 15 minutes. The mixture was filtered, the filter cake washed with 50 ml. water, and the washings combined with the filtrate. The cyanamide solution was added to the cooked starch paste and the mixture heated. Heating was discontinued when the reaction mixture reached a temperature of 200° F. in 13 minutes. The mix was then divided into 3 portions and treated as follows:

A. The polymer was precipitated with 3 volumes of glacial acetic acid, washed free of salts with 75% acetic acid and analyzed for nitrogen content.

B. This portion was maintained at a temperature of 200° F. until the charge of the colloid was 0, and then treated as in A.

C. This portion was cooled to 78° F. and checked for colloid charge at the intervals indicated below. After 24 hours, the polymer was precipitated and analyzed for nitrogen content, as in A.

| Time | B | |
|---|---|---|
| | pH | Sign of charge |
| 5 minutes | 11.0 | + |
| 1 hour | 10.7 | + |
| 4 hours | 10.2 | 0 |

| Time | C | |
|---|---|---|
| | pH | Sign of charge |
| 5 minutes | 11.0 | + |
| 1 hour | 11.0 | + |
| 4 hours | 10.9 | + |
| 24 hours | 10.9 | + |

| | A | B | C |
|---|---|---|---|
| Nitrogen percent dry basis | 0.564 | 0.182 | 1.156 |

These tests demonstrate the rapid reaction and relatively rapid reversion when the reaction mixture is maintained at a temperature as high as 200° F. The product of A analyzed immediately after reaching a reaction temperature of 200° F. showed an increase in nitrogen content from 0.006% to 0.564%. After being maintained at this temperature for 4 hours, cationicity was gone and nitrogen content reduced to 0.182%. However, when, in C, the product was cooled to room temperature after heating to the 200° F. reaction temperature, nitrogen content increased to 1.156%, showing that the initial high temperature is not deleterious so long as it is not maintained for an excessive period of time. This fact is of importance where the colloidal dispersion is desirably heated under conditions of use for a short period of time as, for example, to increase impregnation of a size coating for paper or textiles.

Example 22

Gum guar and CaNCN, both in the dry granular state, were mixed in a ratio of 85 to 15 parts by weight to form a dry, stable, storageable composition.

The mixture was colloidally dispersed in water by dissolving 1 part in 100 parts of water at 78° F. The aqueous reaction mixture showed the following properties at the following intervals:

| Time | pH | Charge |
|---|---|---|
| 5 minutes | 11.5 | + |
| 48 hours | 11.5 | + |

The stability of the dry polymer-cyanamide mix was tested by aqueously dispersing the dry mix as above, 1 week and again 1 month after the original formulation. In both cases, the aqueous colloidal dispersions were cationic, with a pH of 11.5.

The preparation of nitrogenated ungelatinized granular starch products is disclosed and claimed in our copending application Serial No. 786,927, filed January 15, 1959, and the preparation of nitrogenated high amylose starch products having an amylose content of at least 50% is disclosed and claimed in our copending application Serial No. 827,715 filed January 17, 1959.

Although this invention has been described with reference to illustrative embodiments thereof, it will be apparent to those skilled in the art that the principles of this invention can be embodied in other forms but within the scope of the claims.

We claim:

1. Cationic nitrogenated polymeric polyol products obtained by reacting a non-cationic polymeric polyol hydrophilic colloid from the group consisting of gelatinized starch, dextrins, polysaccharide gums, pectins, hemicelluloses, colloidally dispersible cellulose derivatives, and polyvinyl alcohol colloidally dispersed in an aqueous solution, with a compound from the group consisting of cyanamide, alkali metal salts of cyanamide and alkaline earth metal salts of cyanamide at a pH of at least 1, until a cationic nitrogenated polymeric polyol is formed.

2. A cationic nitrogenated gelatinized starch obtained by reacting a starch gelatinized in an aqueous solution with a compound from the group consisting of cyanamide, alkali metal salts of cyanamide and alkaline earth metal salts of cyanamide at a pH at least 1 until a cationic nitrogentaed gelatinized starch is formed.

3. A cationic nitrogenated dextrin obtained by reacting a dextrin colloidally dispersed in an aqueous solution with a compound from the group consisting of cyanamide, alkali metal salts of cyanamide and alkaline earth metal salts of cyanamide at a pH of at least 1 until a cationic nitrogenated dextrin is formed.

4. A cationic nitrogenated polysaccharide gum obtained by reacting a polysaccharide gum colloidally dispersed in an aqueous solution with a compound from the group consisting of cyanamide, alkali metal salts of cyanamide and alkaline earth metal salts of cyanamide at a pH of at least 1 until a cationic nitrogenated polysaccharide gum is formed.

5. A cationic nitrogenated pectin obtained by reacting a pectin colloidally dispersed in an aqueous solution with a compound from the group consisting of cyanamide, alkali metal salts of cyanamide and alkaline earth metal salts of cyanamide at a pH of at least 1 until a cationic nitrogenated pectin is formed.

6. A cationic nitrogenated hemicellulose obtained by reacting a hemicellulose colloidally dispersed in an aqueous solution with a compound from the group consisting of cyanamide, alkali metal salts of cyanamide and alkaline earth metal salts of cyanamide at a pH of at least 1 until cationic nitrogenated hemicellulose is formed.

7. A cationic nitrogenated sodium carboxy methyl cellulose obtained by reacting sodium carboxy methyl cellulose colloidally dispersed in an aqueous solution with a compound from the group consisting of cyanamide, alkali metal salts of cyanamide and alkaline earth metal salts of cyanamide at a pH of at least 1 until a cationic nitrogenated sodium carboxy methyl cellulose is formed.

8. A cationic nitrogenated methyl cellulose obtained by reacting methyl cellulose colloidally dispersed in an aqueous solution with a compound from the group consisting of cyanamide, alkali metal salts of cyanamide and alkaline earth metal salts of cyanamide at a pH of at least 1 until a cationic nitrogenated methyl cellulose is formed.

9. A cationic nitrogenated polyvinyl alcohol obtained by reacting polyvinyl alcohol colloidally dispersed in an aqueous solution with a compound from the group consisting of cyanamide, alkali metal salts of cyanamide and alkaline earth metal salts of cyanamide at a pH of at least 1 until a cationic nitrogenated polyvinyl alcohol is formed.

10. A composition consisting essentially of a dry water-dispersible mixture of a non-cationic, polymeric polyol hydrophilic colloid selected from the group consisting of gelatinized starch, dextrins, polysaccharide gums, pectins, hemicelluloses, colloidally dispersible cellulose derivatives, and polyvinyl alcohol, and a compound selected from the group consisting of cyanamide, the alkali metal salts of cyanamide, and the alkaline earth metal salts of cyanamide.

11. The composition of claim 10 in which the cyanamide compound is calcium cyanamide.

12. The composition of claim 11 in which the polymeric polyol is a carbohydrate gum.

References Cited in the file of this patent

UNITED STATES PATENTS

| 2,538,903 | Gaver et al. | Jan. 23, 1951 |
| 2,894,944 | Paschall | July 14, 1959 |

FOREIGN PATENTS

| 508,977 | Canada | Jan. 11, 1955 |